(12) United States Patent
Vrabel

(10) Patent No.: US 11,281,473 B2
(45) Date of Patent: Mar. 22, 2022

(54) DUAL WAKEUP INTERRUPT CONTROLLERS

(71) Applicant: Arm Limited, Cambridge (GB)

(72) Inventor: Peter Vrabel, Cambridge (GB)

(73) Assignee: Arm Limited, Cambridge (GB)

( * ) Notice: Subject to any disclaimer, the term of this patent is extended or adjusted under 35 U.S.C. 154(b) by 215 days.

(21) Appl. No.: 16/376,075

(22) Filed: Apr. 5, 2019

(65) Prior Publication Data

US 2020/0319896 A1     Oct. 8, 2020

(51) Int. Cl.
| | |
|---|---|
| *G06F 1/32* | (2019.01) |
| *G06F 9/4401* | (2018.01) |
| *G06F 1/3296* | (2019.01) |
| *G06F 1/28* | (2006.01) |
| *G06F 1/08* | (2006.01) |
| *G06F 9/48* | (2006.01) |
| *G06F 1/3287* | (2019.01) |
| *G06F 1/3234* | (2019.01) |

(52) U.S. Cl.
CPC .............. *G06F 9/4418* (2013.01); *G06F 1/08* (2013.01); *G06F 1/28* (2013.01); *G06F 1/3287* (2013.01); *G06F 1/3296* (2013.01); *G06F 9/4812* (2013.01); *G06F 1/3234* (2013.01)

(58) Field of Classification Search
CPC .............. G06F 9/4418; G06F 9/4812; G06F 1/3234–3296; G06F 1/234; G06F 1/04; G06F 1/06; G06F 1/08; G06F 1/10; G06F 1/105; G06F 1/12; G06F 1/14; G06F 2213/2414; G06F 1/3203; G06F 1/3206; G06F 1/3287; G06F 1/32; G05B 2219/13001

USPC .......................................................... 713/323
See application file for complete search history.

(56) References Cited

U.S. PATENT DOCUMENTS

| | | | | |
|---|---|---|---|---|
| 5,919,264 A | * | 7/1999 | Reneris ................. | G06F 1/3228 713/324 |
| 6,088,794 A | * | 7/2000 | Yoon ..................... | G06F 3/0689 713/2 |
| 8,352,770 B2 | * | 1/2013 | Fleming ................ | G06F 1/3287 713/324 |
| 2003/0014677 A1 | * | 1/2003 | Howard ................ | G06F 1/3253 713/323 |

(Continued)

OTHER PUBLICATIONS

"Lallement et al., A 2.7 pJ/cycle 16 MHz, 0.7 µW Deep Sleep Power ARM Cortex-M0+ Core SoC in 28 nm FD-SOI 2018" (Year: 2018).*

*Primary Examiner* — Danny Chan
(74) *Attorney, Agent, or Firm* — Nixon & Vanderhye P.C.

(57) ABSTRACT

Apparatuses comprising processing circuitry, a first wakeup interrupt controller connected to the processing circuitry via a first interface, and a second wakeup interrupt controller connected to the processing circuitry via a second interface, and methods of operating such apparatuses, are disclosed. Prior to the processing circuitry entering a low power state, information defining at least one wakeup event is transferred from the processing circuitry to a selected wakeup interrupt controller. Whilst the processing circuitry is in the low power state, the selected wakeup interrupt controller receives event indications. If one of these event indications is a defined wakeup event, then the processing circuitry is caused to exit the low power state.

19 Claims, 5 Drawing Sheets

(56) References Cited

U.S. PATENT DOCUMENTS

| | | | | |
|---|---|---|---|---|
| 2005/0044430 | A1* | 2/2005 | Cheshire | H04L 67/28 |
| | | | | 713/300 |
| 2006/0075269 | A1* | 4/2006 | Liong | G06F 1/3209 |
| | | | | 713/300 |
| 2008/0098246 | A1* | 4/2008 | Kim | G06F 1/3287 |
| | | | | 713/323 |
| 2009/0164814 | A1* | 6/2009 | Axford | G06F 1/3203 |
| | | | | 713/320 |
| 2009/0164817 | A1* | 6/2009 | Axford | G06F 1/3203 |
| | | | | 713/322 |
| 2009/0172163 | A1* | 7/2009 | Carroll | H04L 12/12 |
| | | | | 709/226 |
| 2009/0210734 | A1* | 8/2009 | Schramm | G06F 13/385 |
| | | | | 713/324 |
| 2009/0327769 | A1* | 12/2009 | Hatano | G06F 1/3203 |
| | | | | 713/300 |
| 2011/0286504 | A1* | 11/2011 | Wang | G06F 1/3203 |
| | | | | 375/222 |
| 2012/0066523 | A1* | 3/2012 | Kobayashi | H04L 12/44 |
| | | | | 713/300 |
| 2013/0073884 | A1* | 3/2013 | Ulmer | G06F 1/3203 |
| | | | | 713/320 |
| 2014/0013141 | A1* | 1/2014 | Heo | H04W 52/027 |
| | | | | 713/323 |
| 2016/0091959 | A1* | 3/2016 | Barak | G06F 1/3287 |
| | | | | 713/320 |
| 2019/0339757 | A1* | 11/2019 | Roy | G06F 1/26 |
| 2019/0391840 | A1* | 12/2019 | Tachibana | G06F 13/1684 |

\* cited by examiner

DUAL WAKEUP INTERRUPT CONTROLLERS

TECHNICAL FIELD

The present disclosure relates to data processing apparatuses. In particular, the present disclosure relates to the management of interrupts and the receipt of interrupts when processing circuitry is in a reduced power state.

DESCRIPTION

Interrupts may be used to alert processing circuitry to an event that needs attention. When the processing circuitry enters a sleep mode, or at least a state in which the power supplied is reduced in some way, the processing circuitry is no longer able to respond to indications of interrupts which have been received since the processing circuitry entered the reduced power mode.

SUMMARY

At least some examples provide an apparatus comprising:
processing circuitry for performing data processing operations;
a first wakeup interrupt controller having a first interface to the processing circuitry; and
a second wakeup interrupt controller having a second interface to the processing circuitry,
wherein, the processing circuitry is responsive to a low power trigger to perform a transfer to a selected wakeup interrupt controller of the first and second wakeup interrupt controllers of information defining a wakeup event prior to entering a low power state, and
the selected wakeup interrupt controller is responsive to the wakeup event to cause the processing circuitry to exit the low power state.

At least some examples provide method of operating an apparatus comprising:
performing data processing operations in processing circuitry;
in response to a low power trigger, transferring to a selected wakeup interrupt controller of a first wakeup interrupt controller and a second wakeup interrupt controller, information defining a wakeup event prior to causing the processing circuitry to enter a low power state,
wherein the first wakeup interrupt controller has a first interface to the processing circuitry and the second wakeup interrupt controller has a second interface to the processing circuitry; and
causing the processing circuitry to exit the low power state in response to the wakeup event.

At least some examples provide an apparatus comprising:
means for performing data processing operations;
in response to a low power trigger, means for transferring to a selected wakeup interrupt controller of a first wakeup interrupt controller and a second wakeup interrupt controller, information defining a wakeup event prior to causing the means for performing data processing operations to enter a low power state,
wherein the first wakeup interrupt controller has a first interface to the means for performing data processing operations and the second wakeup interrupt controller has a second interface to the means for performing data processing operations; and means for causing the means for performing data processing operations to exit the low power state in response to the wakeup event.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
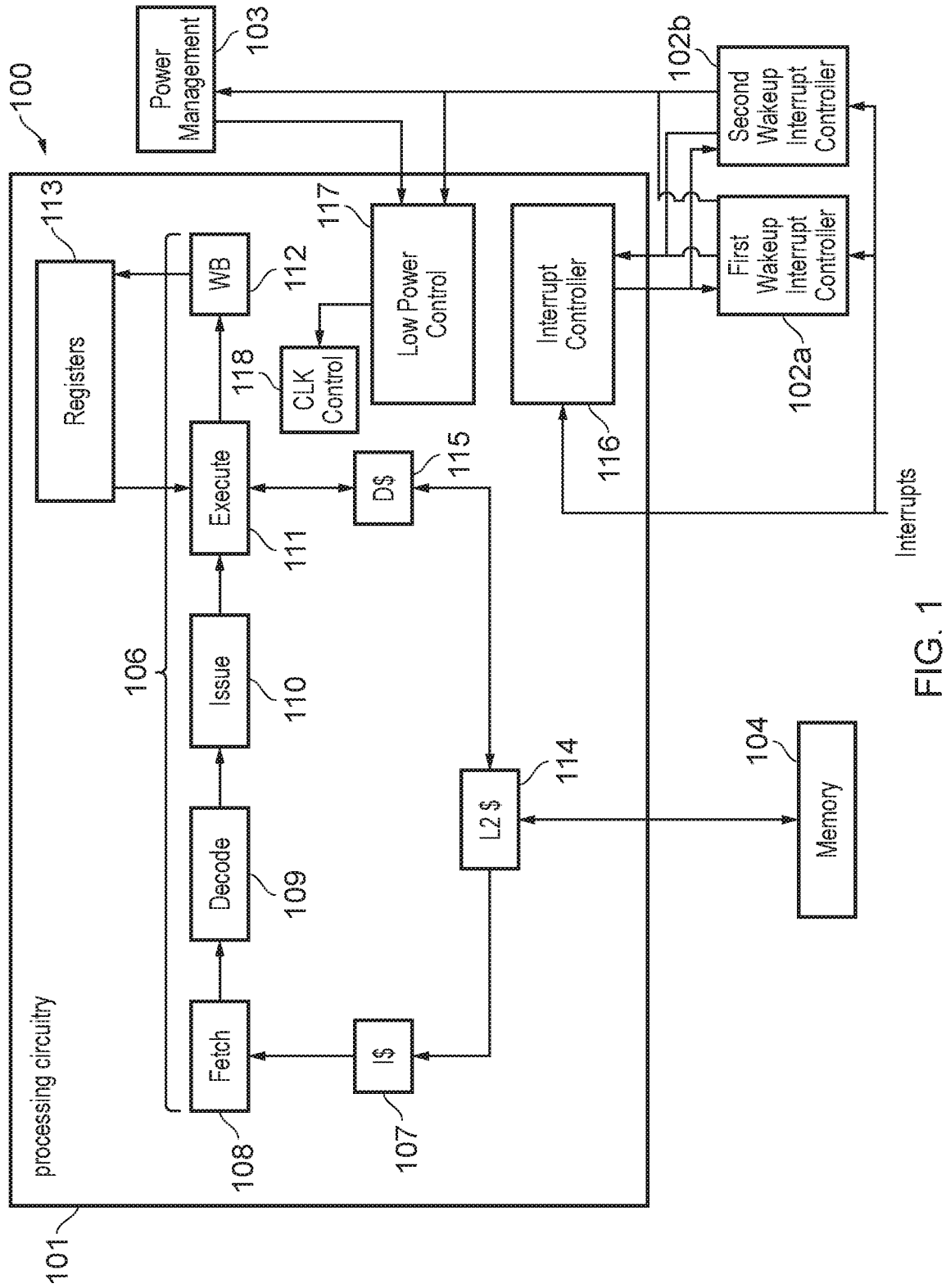
FIG. 1 schematically illustrates an example of a data processing apparatus comprising two wakeup interrupt controllers in example embodiments.

Before discussing the embodiments with reference to the accompanying figures, the following description of embodiments is provided.

In order to save power, some data processing systems have the ability to implement a low power state. Whilst at least some data processing circuitry is in a low power state, a wakeup interrupt controller (WIC) may be used to receive interrupts (and possibly other event indications). Prior to entering the low power state, the processing system may transfer information to the WIC defining which events (e.g. interrupts) should cause the data processing circuitry to be caused to exit the low power state. The present techniques propose an apparatus in which at least two WICs are provided and a selection can be made as to which should be in use during the low power state.

In accordance with one example configuration there is provided an apparatus comprising: processing circuitry for performing data processing operations; a first wakeup interrupt controller having a first interface to the processing circuitry; and a second wakeup interrupt controller having a second interface to the processing circuitry. The processing circuitry is responsive to a low power trigger to perform a transfer to a selected wakeup interrupt controller of the first and second wakeup interrupt controllers of information defining a wakeup event prior to entering a low power state. The selected wakeup interrupt controller is responsive to the wakeup event to cause the processing circuitry to exit the low power state.

The processing circuitry transfers information to the selected WIC defining at least one event to which it should respond by waking up the processing circuitry. A wakeup event may be variously defined, and may for example have an external source (such as in the case of a user pressing a button) or may be related to a system internal event such as a signal from a peripheral device or even from other processing circuitry. This information defining a wakeup event must be transferred prior to the processing circuitry entering the low power state, as it holds the conditions for exit. The selected wakeup interrupt controller is responsive to the wakeup event to cause the processing circuitry to exit the low power state. Whilst the processing circuitry is in the low power state, event indications are received and stored. If a wakeup event is received it causes the processing circuitry to exit the low power state. Information about the wakeup event and any other events that occurred whilst the processing circuitry was in the low power state may be transferred back to the processing circuitry for further handling.

Providing an apparatus with two WICs allows those WICs to be provided with different configurations and operating characteristics. Hence a choice can made between the two WICs based on these configurations/characteristics in dependence on, say, the current priorities of the processing circuitry. The system thereby has greater flexibility. The differences in configuration/characteristics of the two WICs may be variously provided, depending on the range of performance required.

The first interface (to the first WIC) may support a wider bandwidth than the second interface (to the second WIC). When the first interface to the first WIC is wider than the second interface to the second WIC, more information can be transferred per clock cycle. However, it will also be recognized that this wider interface may consume more power, relative to a narrower second interface, as a result. By providing the processing circuitry with access to both, for any given low power state entry the processing circuitry can prioritize between the speed of transfer and the energy consumed.

In some examples, the first interface supports a first bandwidth sufficient to enable the information defining the wakeup event to be transferred to the first wakeup controller in a single clock cycle. Where the information defining the wakeup event has a certain length (number of bits), when the interface width supports the same or a greater number of bits, it can be capable of transferring all of that information in a single clock cycle. There may be circumstances in which it is advantageous to make the entry to the low power state relatively quickly, and being able to transfer information across the interface in a single clock cycle supports this.

The second interface may support a second bandwidth which is insufficient to enable the information defining the wakeup event to be transferred to the second wakeup controller in a single clock cycle. When a bit width of the information to be transferred is wider than the second interface, then information transfer across this interface must be carried out over several clock cycles. This may however consume less power, which can, in some circumstances, be preferable.

In at least some examples, the processing circuitry is responsive to the low power trigger to transfer information defining a plurality of wakeup events prior to entering the low power state. Hence there may be more than one event which will cause the processing circuitry to exit the low power state. The processing circuitry therefore must transfer information defining all of these possible events to the selected WIC. A wakeup event might constitute two defined signals being received by the WIC for example. In this case the information must define receipt of both signals. Even though the processing circuitry may transfer information defining many possible events to the WIC, the occurrence and receipt of an indication of just one of the defined events will cause the processing circuitry to exit the low power state.

The first interface may support a first bandwidth sufficient to enable the information defining the plurality of wakeup events to be transferred to the first wakeup controller in a single clock cycle. Thus in some examples the first interface is wide enough to transfer the information defining the plurality of wakeup events in a single clock cycle, supporting a faster transition of the processing circuitry into the low power state.

In at least some examples, the processing circuitry is arranged to perform the transfer of the information defining the wakeup event to the second wakeup interrupt controller by specifying the second wakeup interrupt controller as a memory mapped target via the second interface. In other words the system memory map is configured such that the second wakeup interrupt controller forms part of that memory map. More specifically the storage in the second wakeup interrupt controller which holds the information defining the wakeup event(s) may form part of the memory map, such that the processing circuitry can simply address it and write information to it through its usual memory access mechanisms.

The processing circuitry may further comprise finite state machine circuitry to control the transfer of the information defining the wakeup event to the second wakeup interrupt controller. As such the interaction via the second interface may be under the control of the finite state machine. This allows the control interaction via the second interface to be delegated by the processing circuitry, freeing up resource in the processing circuitry for other purposes. The defined states of the finite state machine may be variously configured in dependence on the system requirements and in particular on the particular configuration of the second interface. These could however include, for example: a state of receiving the information for transfer; a state of checking that the WIC is ready to receive the information; a state of transferring the information; and a state of checking that the WIC has received the information.

In some example embodiments, the first wakeup interrupt controller and the processing circuitry have a shared clock domain. The sharing of a clock domain between the first wakeup interrupt controller and the processing circuitry can facilitate efficient transfer of information between the two. For example, this avoids the need for clock domain crossing (CDC) cells. Signaling between the two may also be facilitated in the case of a shared clock domain simply by virtue of the likely proximity of the two, which may for example avoid the need for any signal boosting between them.

The second wakeup interrupt controller and the processing circuitry may be in different clock domains. Where a slower transfer of information is admissible, the second WIC may be in a different clock domain to that of the processing circuitry. Although slower, the flexibility that this arrangement brings in terms of the placement of the second wakeup interrupt controller may be desirable.

In some embodiments the low power state is one of a plurality of low power states for the processing circuitry and the low power state is selected from the plurality of low power states. Generally, a low power state of the processing circuitry is one in which it consumes less power than a fully operational state, but active data processing operations are not carried out. This may involve a reduction in the voltage supplied to some or all components and/or a suspension of clock signal. There are various ways in which low power states may be implemented and indeed a given system may support more than one. For example, a "shallow sleep" state may be defined for the processing circuitry in which gating of the clock signals to some or all components is carried out. The processing circuitry can therefore enter and exit this state relatively quickly. By contrast, a "deep sleep" state may be defined for the processing circuitry in which power to some or all components is removed. Entrance to and exit from this state for the processing circuitry is therefore likely to take relatively longer. However the power saving benefits of the deep sleep state are also likely to be better than those of the shallow sleep state.

Selection of the selected wakeup interrupt controller may be dependent on the selected low power state. For example, if the processing circuitry is going to enter a shallow sleep state then the first WIC may be selected on the basis of its characteristics and those of the first interface between the first WIC and the processing circuitry. Conversely, the second WIC may be selected if the processing circuitry is to enter a deep sleep.

The processing circuitry may be arranged to select the selected wakeup interrupt controller. The decision as to which WIC to select may be taken within the processing circuitry itself, for example as part of a software routine.

In some examples, power management circuitry is arranged to select the selected wakeup interrupt controller. In some configurations, determination of which WIC should be selected is made by circuitry separate from the processing circuitry. A determination may for example be made taking into account the current processing load of other processing circuitry in a wider data processing system.

The apparatus may further comprise a clock generator, wherein the low power state is a state in which a clock signal generated by the clock generator for the processing circuitry is withheld (gated) from the processing circuitry. As mentioned above, exit from this type of low power state may be relatively fast.

The low power state may be a state in which power is withheld from at least one component of the processing circuitry. In order to save power, the low power state may be one in which the power supply to one or more components is turned off. Different low power modes may comprise a different proportion of the components having their power reduced or withheld. Note that the selected WIC does not have power withheld from it whilst the processing circuitry is in the low power state. Conversely the non-selected WIC (of the two WICs) may indeed have its power withheld from it whilst the processing circuitry is in the low power state.

The low power state may be a state in which power is supplied at a reduced voltage to at least one component of the processing circuitry. In some cases, components are supplied with a reduced voltage such that the values they hold are preserved, yet the processing circuitry does not continue active data processing. In this way, less power is consumed by the processing circuitry compared to a fully powered, active state, but at least some of the state held is retained. By reducing the voltage supplied to components, rather than removing the power supply altogether, exit from the low power state may be quicker as storage holding the relevant state values does need to be repopulated before data processing can resume. It will be appreciated that a combination of these techniques may be used to implement a low power state.

In at least some examples, the low power trigger is a signal generated by the processing circuitry. For example, the processing circuitry may be configured to determine which power state it should be in and to enter a low power state when it is appropriate to do so. It may make a determination based on its current workload for example, or it might make a determination based on an idle period. There may be a dedicated low power control element of the processing circuitry to control entry to and exit from a low power state.

The low power trigger may be a signal received by the processing circuitry. An external device such as a power management controller may determine when the processing circuitry should enter a low power state. This may take into account other factors external to the processing circuitry, such as the current workload of other processor circuitry in a wider data processing system.

In accordance with one example configuration there is provided a method of operating an apparatus comprising:

performing data processing operations in processing circuitry;

in response to a low power trigger, transferring to a selected wakeup interrupt controller of a first wakeup interrupt controller and a second wakeup interrupt controller, information defining a wakeup event prior to causing the processing circuitry to enter a low power state, wherein the first wakeup interrupt controller has a first interface to the processing circuitry and the second wakeup interrupt controller has a second interface to the processing circuitry; and causing the processing circuitry to exit the low power state in response to the wakeup event.

In accordance with one example configuration there is provided an apparatus comprising:

means for performing data processing operations;

in response to a low power trigger, means for transferring to a selected wakeup interrupt controller of a first wakeup interrupt controller and a second wakeup interrupt controller, information defining a wakeup event prior to causing the means for performing data processing operations to enter a low power state, wherein the first wakeup interrupt controller has a first interface to the means for performing data processing operations and the second wakeup interrupt controller has a second interface to the means for performing data processing operations; and means for causing the means for performing data processing operations to exit the low power state in response to the wakeup event.

Particular embodiments will now be described with reference to the figures.

FIG. 1 schematically illustrates a data processing apparatus 100 in accordance with example embodiments. Processing circuitry 101 comprises a generally pipelined structure 106 for executing instructions, which is only illustrated at a cursory overview level here. In the example of FIG. 1, the processing pipeline 106 includes a fetch stage 108 for fetching instructions from the memory 104 to be cached in the L2 cache 114 and the L1 instruction cache 107. A decode stage 109 decodes fetched instructions. The issue stage 110 issues the decoded instructions for execution at the execution stage 111. A write back stage 112 may write back the result of an operation to a register in the register bank 113. It will be appreciated that FIG. 1 is merely exemplary and does not (even schematically) show all elements of the processing pipeline 106. An interrupt controller 116 may be provided in the processing circuitry 101 to manage interrupts received whilst the processing circuitry is active. A low power control 117 may be included to control the processing circuitry's entry to and exit from low power states. A clock control unit 118 may be responsible for the distribution of a clock signal to the components of the data processing circuitry 101 and the low power control 117 can implement one type of low power state by causing the clock control unit 118 to gate (withhold) a clock signal from some or all components of the processing circuitry 101. Two wakeup interrupt controllers 102a and 102b are provided, and a selected one of them is used to manage interrupts received whilst the processing circuitry 101 is in a low power state. Power management circuitry 103 may also be provided to control power supply to the processing circuitry 101 as a whole or to its components individually.

Figure 2:
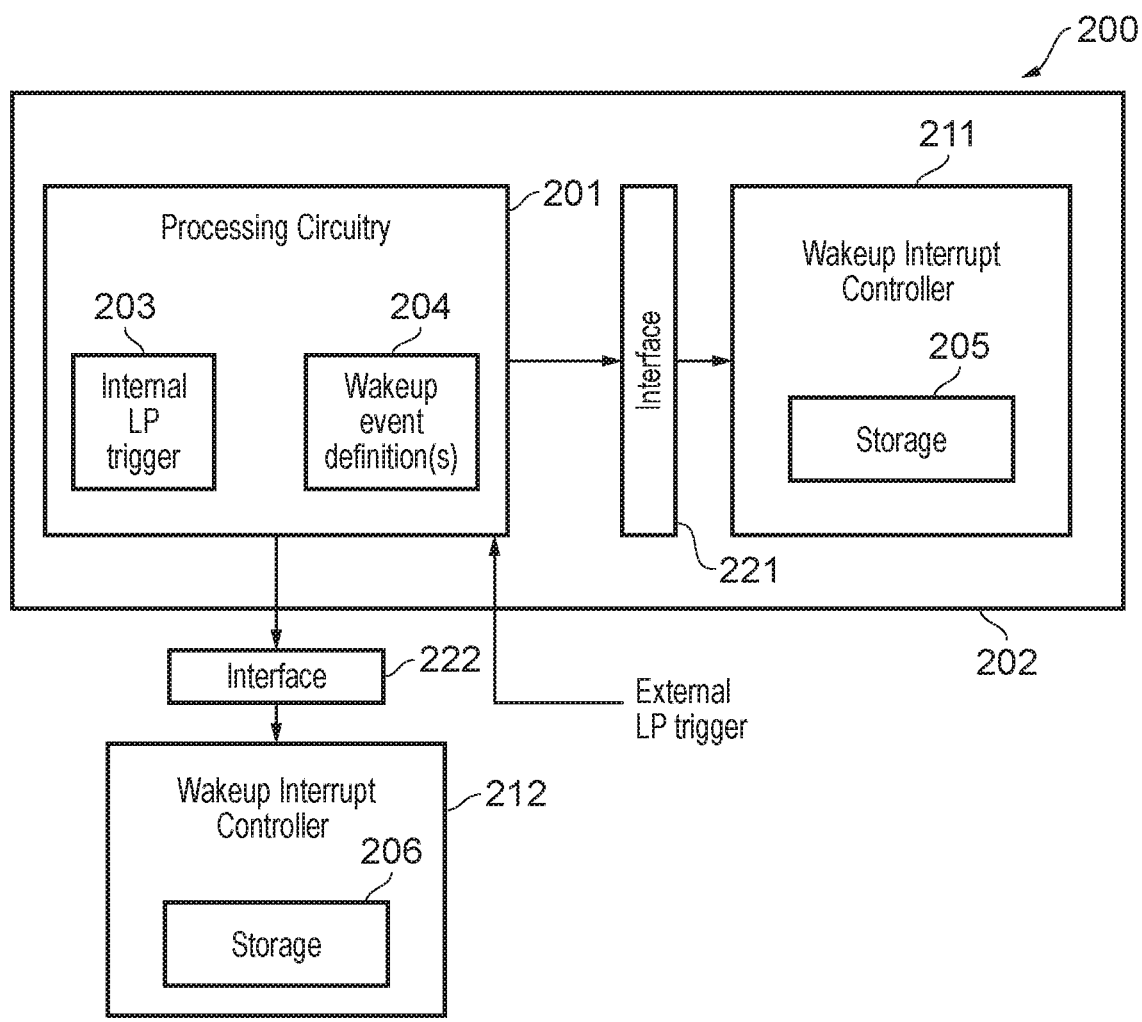
FIG. 2 schematically illustrates an apparatus according to example embodiments.

FIG. 2 schematically illustrates an apparatus 200 in accordance with some embodiments. Processing circuitry 201 may for example be configured in accordance with the example shown in FIG. 1. The processing circuitry 201 is connected to a first wakeup interrupt controller 211 via a first interface 221. The processing circuitry 201 is also connected to a second wakeup interrupt controller 212 via a second interface 222. The first interface 221 and the second interface 222 may have different configurations, such that the characteristics of an interaction with the first wakeup interrupt controller 211 and the second wakeup interrupt controller 212 also differ. For example the bandwidth of the first interface 221 may be wider than the second interface 222, such that a greater number of bits of information can be transferred in a single clock cycle across the first interface. In the example shown in FIG. 2 the first wakeup interrupt controller 211 is provided as part of the same part of the wider data processing apparatus 200. For example processing circuitry 201, interface 221, and wakeup interrupt controller 211 may be formed as part of a system-on-chip 202, whilst interface 222 provides access to wakeup interrupt controller 212, which is off-chip. As such processing circuitry 201, interface 221, and wakeup interrupt controller 211 may also be comprised within a shared clock domain, whilst the second wakeup interrupt controller 212 may be in a separate clock domain and indeed physically positioned somewhat further away from the processing circuitry 201 than the first wakeup interrupt controller 211. The processing circuitry can 201 can be caused to enter a low power state by a low power trigger. This trigger may be generated within the processing circuitry itself, as is represented by the internal low power (LP) trigger 203, which may be a hardware mechanism or may be a software-based determination. For example the processing circuitry may trigger entry into a low power state when it determines that it has been idle for more than a predetermined period. The low power trigger may be generated outside the processing circuitry, as is represented by the external low power (LP) trigger signal line. Another component in a wider data processing system, such as a power management unit (see 103 in FIG. 1) or another processor, may be the source of this external low power (LP) trigger, for example when monitoring the respective activity of this processing circuitry 201 in the context of the activity of several instances of processing circuitry in the data processing system. In response to a low power trigger the processing circuitry causes one or more wakeup event definitions 204 to be transferred to a selected wakeup interrupt controller of the two wakeup interrupt controllers 211 and 212. This selection of the wakeup interrupt controller may be defined in association with the low power trigger dependent (for example the internal LP trigger might cause the "internal" wakeup interrupt controller 211 to be selected, whereas the external LP trigger might cause a the "external" wakeup interrupt controller 212 to be selected). Alternatively the processing circuitry may select the wakeup interrupt controller in dependence on other local factors. The one or more wakeup event definitions 204 are transferred to corresponding storage 205, 206 in the selected wakeup interrupt controller.

Figure 3:
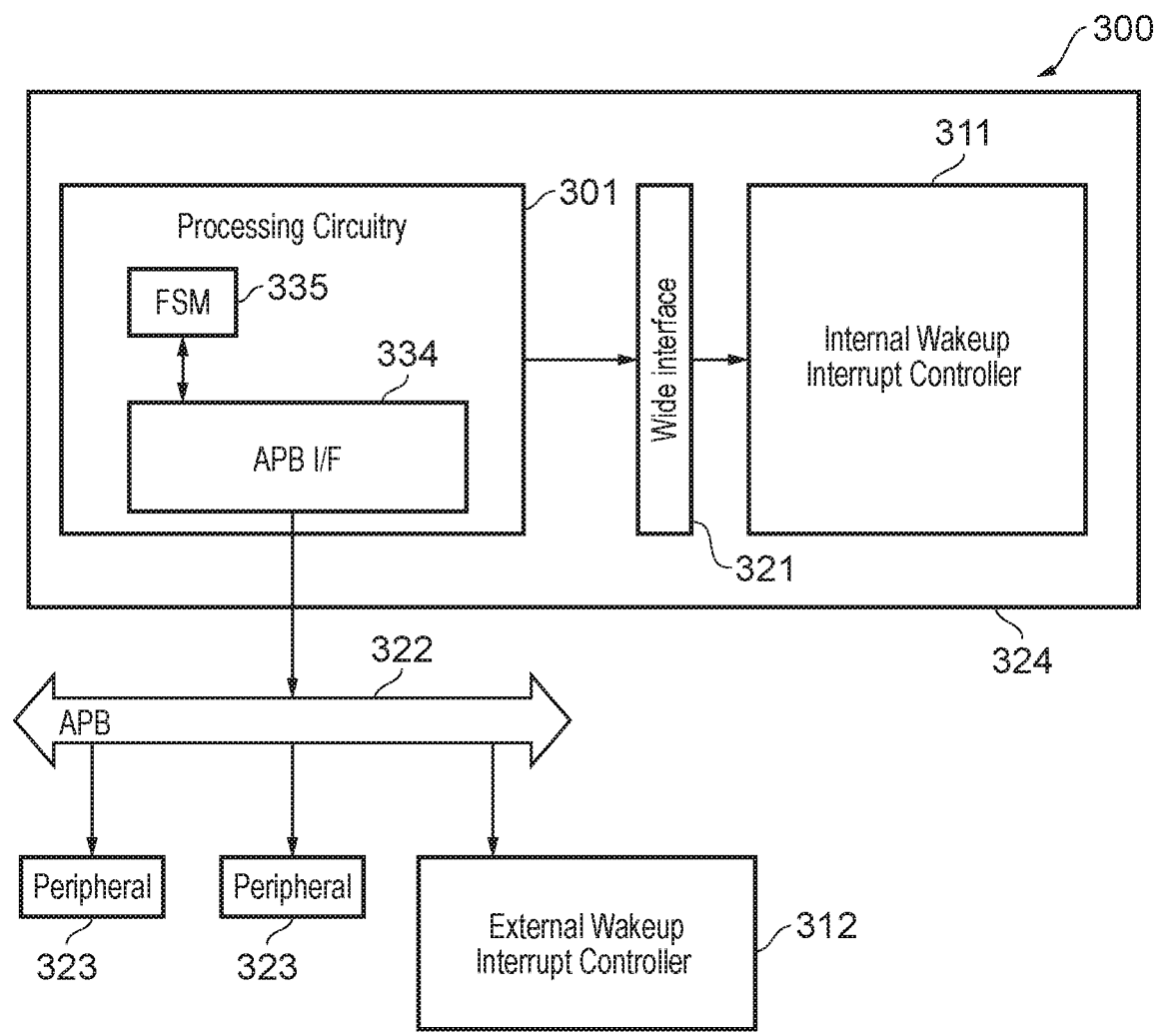
FIG. 3 schematically illustrates an apparatus according to example embodiments which comprise an interface between the processing circuitry and an external wakeup interrupt controller.

FIG. 3 schematically illustrates an apparatus 300 in accordance with some embodiments. The apparatus 300 comprises processing circuitry 301 which interfaces to an internal wakeup interrupt controller (IWIC) 311 via a wide interface 321. The interface 321 is referred to as "wide" here because it has data transfer width which is sufficiently wide for the processing circuitry 301 to transfer a full set of wakeup event definitions to the IWIC 311 in a single clock cycle. Both the processing circuitry 301 and the IWIC 311 are within the same clock domain 324. The processing circuitry 301 is also connected to a bus 322, which in this example is configured as an Advanced Peripheral Bus (APB) as provided by the Advanced Microcontroller Bus Architecture (AMBA) specifications of Arm Limited, Cambridge, UK. An APB interface 334 connects the processing circuitry 301 to the APB 322. The processing circuitry 301 can communicate via the APB 322 to an external wakeup interrupt controller (EWIC) 312. A finite state machine 335 within the processing circuitry 301 controls the transfer of information to the EWIC when it is the selected WIC. The FSM 335 is thus configured with a defined states to control this. Here these include: a state of receiving the information for transfer; a state of checking that the EWIC is ready to receive the information; a state of transferring the information; and a state of checking that the EWIC has received the information. Other peripheral devices 323 may also be accessible to the processing circuitry 301 via the APB 322. In this example the EWIC 312 may be memory mapped for the processing circuitry 301, such that the processing circuitry 301 can address the EWIC 312 (in particular for the transfer of one or more wakeup event definitions) using its usual memory access mechanisms.

Figure 4:
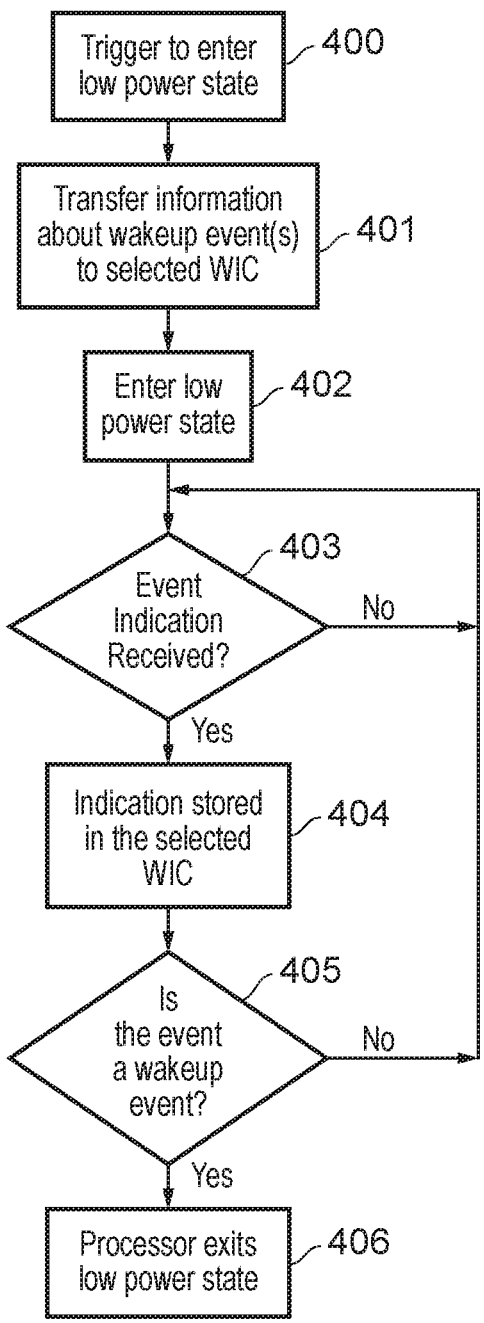
FIG. 4 is a flow diagram illustrating a sequence of steps in the method of example embodiments for entering and exiting a low power state using a selected wakeup interrupt controller.

FIG. 4 shows a sequence of steps which are carried out according to the method of one example embodiment. At step 400 a trigger occurs for the processing circuitry to enter a low power state. The low power state may be one of several possible low power states. Then at step 401 information defining wakeup events for the processing circuitry is transferred to the selected WIC by the corresponding interface. The selection of the WIC may either be predefined for the processing circuitry (for example associated with the low power trigger) or may be determined by the processing circuitry in dependence on current conditions or requirements. At step 402 the processing circuitry enters the low power state. The selected WIC then awaits receipt of an event indication (e.g. an interrupt) at step 403, where the flow loops until an event indication is received. On receipt of an event indication (e.g. an interrupt) at step 403 the flow proceeds to step 404, where an indication of the event is stored in the WIC. It is then determined by the WIC at step 405 whether the event indicated is defined to be a wakeup event or not. If the indication is not a wakeup signal then the flow returns to step 403, and the WIC continues to monitor for further received event indications. If however the indication is a wakeup signal, then the WIC causes the processing circuitry to exit the low power state at step 406. It should be noted that the system may be configured to be ready to immediately repeat this method, i.e. where the processing circuitry is now active again if a trigger occurs for the processing circuitry to enter a low power state, then the method flow would resume at step 400.

Figure 5:
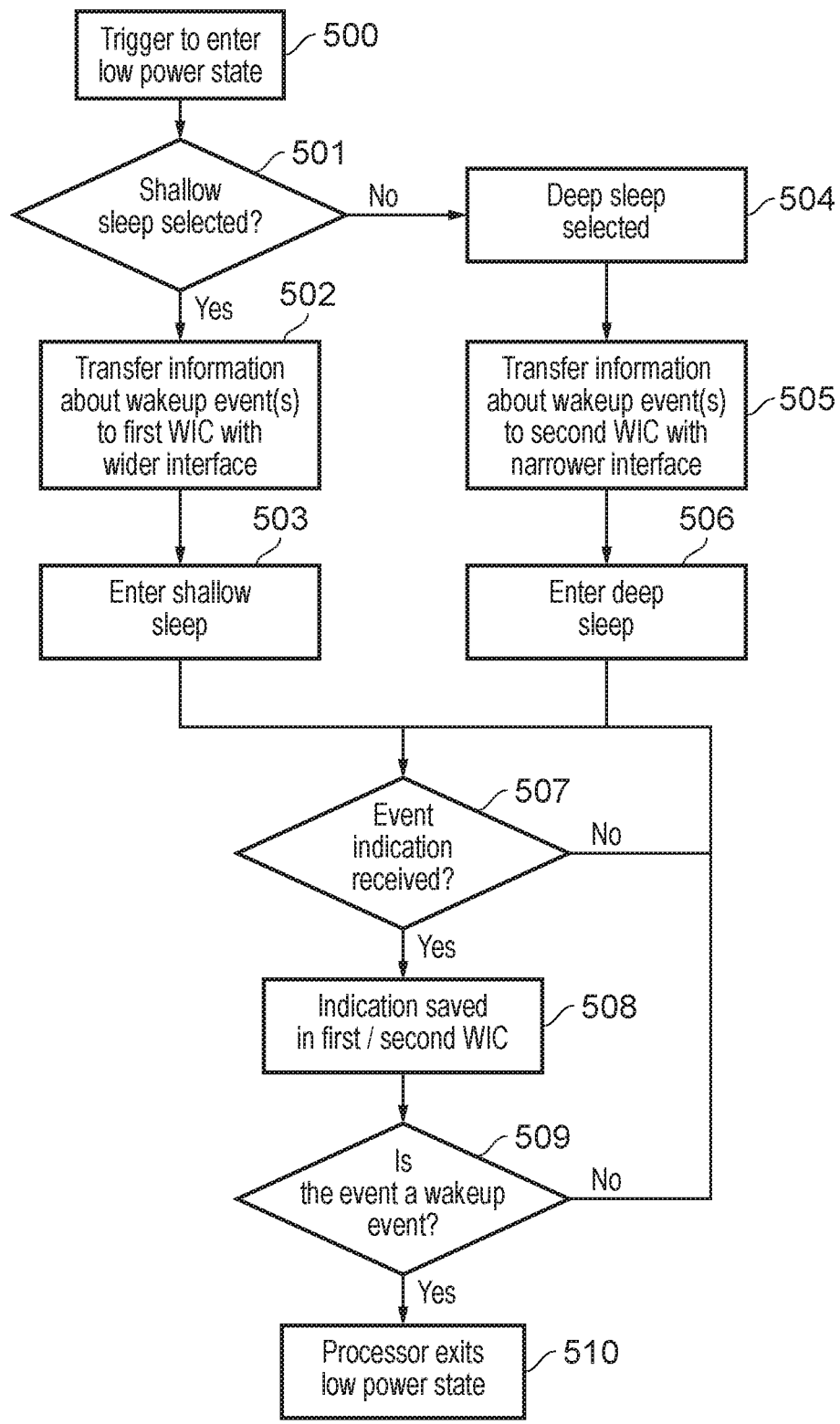
FIG. 5 is a flow diagram illustrating a sequence of steps in the method of example embodiments for entering and exiting a low power state including selecting a wakeup interrupt controller.

FIG. 5 shows a sequence of steps which are carried out according to the method of one example embodiment when processing circuitry enters and exits a low power state. At step 500 a trigger occurs for the processing circuitry to enter a low power state. In this example the processing circuitry has two defined low power states, the first of which is a "shallow sleep" mode in which power is maintained to components of the processing circuitry, a clock signal for the processing circuitry is gated off, so that the processing circuitry is not active (and thus its power consumption is reduced). The processing circuitry also has a "deep sleep" mode in which power is reduced for or even withheld from components of the processing circuitry, so that the processing circuitry is not active (and its power consumption is even further reduced than in the shallow sleep mode). At step 501 it is determined whether the "shallow sleep" mode is selected. This sleep mode selection may either be predefined for the processing circuitry (for example associated with the low power trigger) or may be determined by the processing circuitry in dependence on current conditions or requirements.

If the shallow sleep is determined to be selected at step 501, then a first wakeup interrupt controller is therefore selected as the WIC to use for this sleep mode. At step 502 information defining one or more wakeup events is transferred to the first WIC via a first, wider interface. This wider interface enables a rapid transfer (e.g. within a clock cycle) of the information, supporting a fast transition into the "shallow sleep" low power mode for the processing circuitry at step 503. Conversely if at step 501 the "shallow sleep" is not selected, then (step 504) this will be a transition into the "deep sleep" mode. A second wakeup interrupt controller is therefore the selected WIC and at step 505 information defining one or more wakeup events is transferred to the second WIC via a second, narrower interface. This narrower interface may require longer (than the wider interface to the first WIC) to transfer the information, but entry into the "deep sleep" low power state may be expected to be for a longer duration and therefore entry and exit latency may not be as critical. The processing circuitry enters the deep sleep mode at step 506, when power to its components is gated to implement this state.

Whilst the processing circuitry is in a low power state, if the selected WIC then awaits receipt of an event indication (e.g. an interrupt) at step 507, where the flow loops until an event indication is received. On receipt of an event indication (e.g. an interrupt) at step 507 the flow proceeds to step 508, where an indication of the event is stored in the selected WIC. It is then determined by the WIC at step 509 whether the event indicated is defined to be a wakeup event or not. If the indication is not a wakeup signal then the flow returns to step 507, and the WIC continues to monitor for further received event indications. If however the indication is a wakeup signal, then the WIC causes the processing circuitry to exit the low power state at step 510. This may therefore be an exit from either the "shallow sleep" mode or the "deep sleep" mode. It should be noted that the system may be configured to be ready to immediately repeat this method, i.e. where the processing circuitry is now active again if a trigger occurs for the processing circuitry to enter a low power state, then the method flow would resume at step 500.

In brief overall summary, apparatuses comprising processing circuitry, a first wakeup interrupt controller connected to the processing circuitry via a first interface, and a second wakeup interrupt controller connected to the processing circuitry via a second interface, and methods of operating such apparatuses, are disclosed. Prior to the processing circuitry entering a low power state, information defining at least one wakeup event is transferred from the processing circuitry to a selected wakeup interrupt controller. Whilst the processing circuitry is in the low power state, the selected wakeup interrupt controller receives event indications. If one of these event indications is a defined wakeup event, then the processing circuitry is caused to exit the low power state.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. Apparatus comprising:
   processing circuitry for performing data processing operations;
   a first wakeup interrupt controller having a first interface to the processing circuitry; and
   a second wakeup interrupt controller having a second interface to the processing circuitry,
   wherein, the processing circuitry is responsive to a low power trigger to perform a transfer to a selected wakeup interrupt controller of the first and second wakeup interrupt controllers of information defining a wakeup event prior to entering a low power state, and
   the selected wakeup interrupt controller is responsive to the wakeup event to cause the processing circuitry to exit the low power state,
   wherein the first interface supports a wider bandwidth than the second interface to faster transfer the information defining the wakeup event.

2. The apparatus of claim 1, wherein the first interface supports a first bandwidth sufficient to enable the information defining the wakeup event to be transferred to the first wakeup controller in a single clock cycle.

3. The apparatus of claim 2, wherein the second interface supports a second bandwidth which is insufficient to enable the information defining the wakeup event to be transferred to the second wakeup controller in a single clock cycle.

4. The apparatus of claim 1, wherein the processing circuitry is responsive to the low power trigger to transfer information defining a plurality of wakeup events prior to entering the low power state,
   and the selected wakeup interrupt controller is responsive to any of the plurality of wakeup events to cause the processing circuitry to exit the low power state.

5. The apparatus of claim 4, wherein the first interface supports a first bandwidth sufficient to enable the information defining the plurality of wakeup events to be transferred to the first wakeup controller in a single clock cycle.

6. The apparatus of claim 1, wherein the processing circuitry is arranged to perform the transfer of the information defining the wakeup event to the second wakeup interrupt controller by specifying the second wakeup interrupt controller as a memory mapped target via the second interface.

7. The apparatus of claim 6, wherein the processing circuitry further comprises finite state machine circuitry to control the transfer of the information defining the wakeup event to the second wakeup interrupt controller.

8. The apparatus of claim 1, wherein the first wakeup interrupt controller and the processing circuitry have a shared clock domain.

9. The apparatus of claim 1, wherein the second wakeup interrupt controller and the processing circuitry are in different clock domains.

10. The apparatus of claim 1, wherein the low power state is one of a plurality of low power states for the processing circuitry and the low power state is selected from the plurality of low power states,
and selection of the selected wakeup interrupt controller is dependent on the selected low power state.

11. The apparatus of claim 1, wherein the processing circuitry is arranged to select the selected wakeup interrupt controller.

12. The apparatus of claim 1, further comprising power management circuitry,
wherein the power management circuitry is arranged to select the selected wakeup interrupt controller.

13. The apparatus of claim 1, further comprising a clock generator, wherein the low power state is a state in which a clock signal generated by the clock generator is withheld from the processing circuitry.

14. The apparatus of claim 1, wherein the low power state is a state in which power is withheld from at least one component of the processing circuitry.

15. The apparatus of claim 1, wherein the low power state is a state in which power is supplied at a reduced voltage to at least one component of the processing circuitry.

16. The apparatus of claim 1, wherein the low power trigger is a signal generated by the processing circuitry.

17. The apparatus of claim 1, wherein the low power trigger is a signal received by the processing circuitry.

18. A method of operating an apparatus comprising:
performing data processing operations in processing circuitry;
in response to a low power trigger, transferring to a selected wakeup interrupt controller of a first wakeup interrupt controller and a second wakeup interrupt controller, information defining a wakeup event prior to causing the processing circuitry to enter a low power state,
wherein the first wakeup interrupt controller has a first interface to the processing circuitry and the second wakeup interrupt controller has a second interface to the processing circuitry; and
causing the processing circuitry to exit the low power state in response to the wakeup event,
wherein the first interface supports a wider bandwidth than the second interface to faster transfer the information defining the wakeup event.

19. An apparatus comprising:
means for performing data processing operations;
in response to a low power trigger, means for transferring to a selected wakeup interrupt controller of a first wakeup interrupt controller and a second wakeup interrupt controller, information defining a wakeup event prior to causing the means for performing data processing operations to enter a low power state,
wherein the first wakeup interrupt controller has a first interface to the means for performing data processing operations and the second wakeup interrupt controller has a second interface to the means for performing data processing operations; and
means for causing the means for performing data processing operations to exit the low power state in response to the wakeup event,
wherein the first interface supports a wider bandwidth than the second interface to faster transfer the information defining the wakeup event.

* * * * *